July 11, 1944.   S. SOCHACZEWSKI   2,353,516
DEVICE FOR USE IN MUSKETRY AND LIKE TRAINING
Filed Sept. 28, 1942   7 Sheets-Sheet 1

July 11, 1944.　　　S. SOCHACZEWSKI　　　2,353,516
DEVICE FOR USE IN MUSKETRY AND LIKE TRAINING
Filed Sept. 28, 1942　　　7 Sheets-Sheet 3

INVENTOR
Stanislaw Sochaczewski
BY
A. Knight Croad
ATTORNEY

July 11, 1944.  S. SOCHACZEWSKI  2,353,516
DEVICE FOR USE IN MUSKETRY AND LIKE TRAINING
Filed Sept. 28, 1942   7 Sheets-Sheet 4

INVENTOR
Stanislaw Sochaczewski
BY
ATTORNEY

July 11, 1944. S. SOCHACZEWSKI 2,353,516
DEVICE FOR USE IN MUSKETRY AND LIKE TRAINING
Filed Sept. 28, 1942 7 Sheets-Sheet 6

July 11, 1944.  S. SOCHACZEWSKI  2,353,516
DEVICE FOR USE IN MUSKETRY AND LIKE TRAINING
Filed Sept. 28, 1942  7 Sheets-Sheet 7

Patented July 11, 1944

2,353,516

UNITED STATES PATENT OFFICE 2,353,516

DEVICE FOR USE IN MUSKETRY AND LIKE TRAINING

Stanislaw Sochaczewski, London, England, assignor of one-half to Isabel Dorothy Smeaton, London, England Application September 28, 1942, Serial No. 459,950
In Great Britain October 16, 1941

17 Claims. (Cl. 273—101.2)

This invention relates to devices for use in musketry and like training of the kind comprising a dummy gun or the like having trigger-controlled firing mechanism for projecting a target-recording device.

One object of the invention is to provide a device of the kind described suitable for use in training with semi-automatic weapons, i. e. weapons in which the trigger can be operated a number of times after each cocking operation.

A further object of the invention is to provide a novel form of cocking mechanism, and trigger-controlled firing mechanism, suitable for incorporation in a device of the kind described.

A further object of the invention is to provide means for readily mounting the gun in operative relationship with a target carrying frame in such a way that whilst the gun is movable universally relatively to said frame, said gun and said frame can also be moved together.

Further objects will be apparent from a reading of the annexed specification and claims, and from an examination of the drawings, in which:

Figure 22 is a rear elevation of the target carrying standard;

Figure 23 is a side elevation showing the target carrying standard in a collapsed condition.

Figure 26 illustrates a device for use in testing the accuracy of the line of sight relatively to the piercing end of the rod, and Figure 27 is a detail view of the adjustable rear sight.

Figure 7:
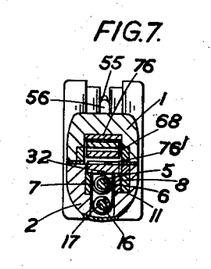

Referring to the drawings:

The stock and butt of the gun are made of wood, the stock comprising upper and lower parts 1, 2, screwed together and housing the mechanism, front and rear sights 3, 4, being provided, and the whole device simulating a standard rifle as regards weight, distribution of weight, and the like. The front and rear sights are designed to give a view similar to that obtained with an orthodox service rifle, and are made adjustable as and for the purpose hereafter described. The main spring 5 (Figure 2) is carried on a rod 6 carried between fixed side plates 7, 8 (Figures 3 and 7), in fixed abutments 9, 10, extending across the stop. The main spring bears at that end adjacent the butt of the gun against the fixed abutment 9, and, at the other end, it presses against a movable abutment $10^1$ slidably mounted on the rod 6. This movable abutment $10^1$ is connected by a sliding plate or bar 11 (Figure 3) extending along the inner side of the stock to the bolt arm 12 which comprises a side extension of the sliding plate 11 projecting through a slot 13 in the side of the stock. This bolt arm 12 has an extension 14 at right angles to the arm, which constitutes an operating piece for the bolt arm. A short damping spring 15 (Figure 2) is carried on the rod between the movable abutment $10^1$ and a shoulder formed on the end of the rod.

Figure 2:
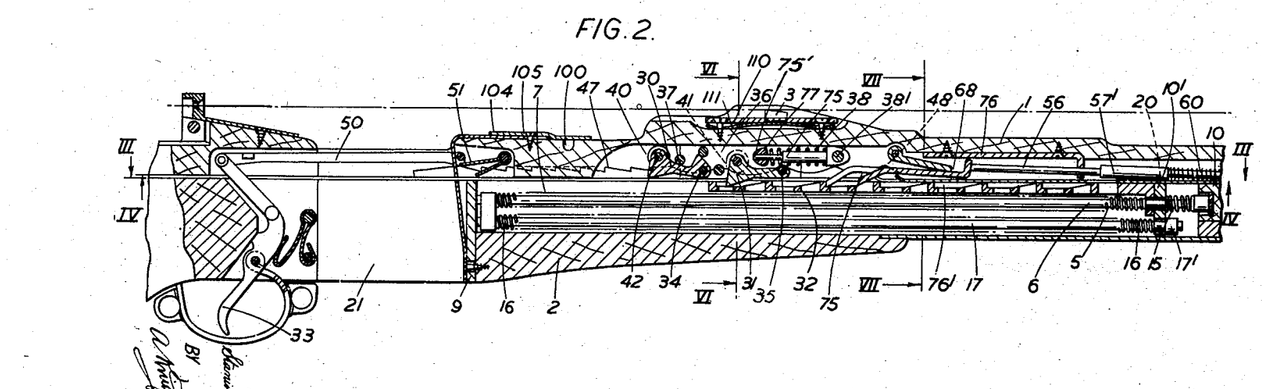
Figure 2 is a sectional elevation of the firing mechanism in the uncocked position.
Figure 3:
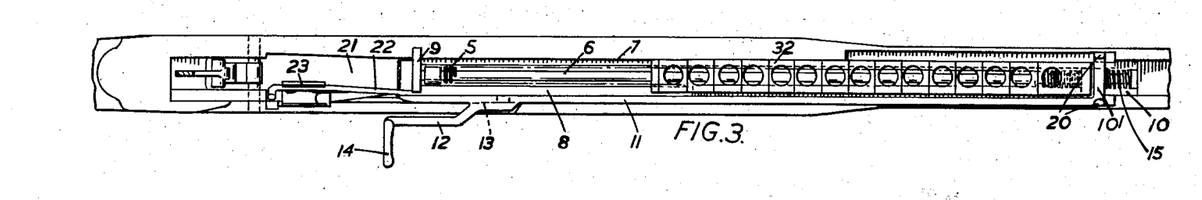
Figures 3 and 4 are respectively sectional plan views on lines III—III and IV—IV, respectively, of Figure 2, seen in the directions of the arrows.

A second spring 16, which may be referred to as the plate return spring, is mounted on a rod 17 disposed vertically below the rod 6. One end of the rod 17 is carried in the fixed abutment 9, and the other end passes through an aperture in the movable abutment 10¹, being held therein by a shoulder 17¹ formed on the rod 17. The spring 16 bears at one end against the fixed abutment 9 and at the other end against the movable abutment 10¹.

The movable abutment 10¹ has two lugs 20, 20, extending upwards respectively from its two vertical edges, these two lugs 20 being hereafter referred to as "operating lugs."

Figure 9:
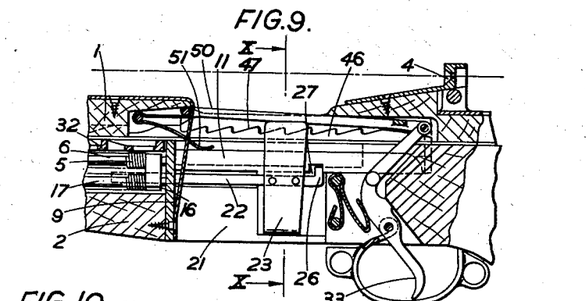
Figure 9 is a part sectional elevation illustrating the practice loading arrangement.
Figure 10:
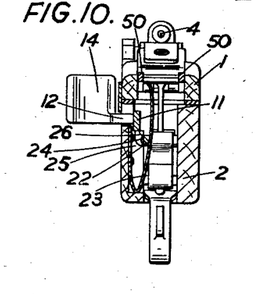
Figure 10 is a cross sectional view taken on line X—X, Figure 9.
Figure 12:
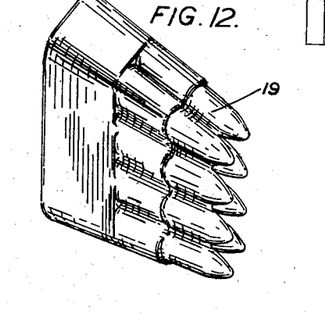
Figure 12 is a detail view of a dummy clip of cartridges.

A slot (Figures 9 and 13) extending vertically through the stock between the fixed abutment 9 and the butt is provided, through which a clip or block 19 of dummy cartridges (Figure 12) can be passed, the clip falling freely through the stock to the ground or on to a table or like surface. Extending longitudinally across this vertical slot 21 is a spring strip 22 (Figures 9 and 10) fixed at one end to the fixed abutment 9 and towards the other end to the free side of a V-shaped plate 23, the other side of which is secured to the stock 2. The free end of the strip 22 projects beyond the edge of the V-plate and is turned outwardly at right angles thereto as shown at 24 (Figure 10) in order to be able to engage a recess 25 provided in the inner surface of the stock. This outwardly turned portion 24 also extends upwardly to constitute a stop 26 (Figure 9) adapted to engage a recess 27 in the lower edge of the sliding plate 11 when the latter is pulled back to cock the gun. The sliding plate 11 has a cam surface on its side arranged to cooperate with the stop 26 during the backward movement of the sliding plate to force the stop into the recess 25 in the stock to free the path for the sliding plate. When the cam surface has passed the stop 26 the latter is free under the spring action of the plate 23 to move into the recess 27 in the edge of the sliding plate and it does so as soon as this recess comes into line therewith, thereby holding the plate in the back, i. e. cocked position, against the pressure of the compressed main and plate return springs. When the dummy clip of cartridges 19 is pushed through the slot 21 the side pressure exerted on the spring strip 22 pushes the stop 26 into the recess 25 in the stock, thereby releasing the sliding plate 11, which, under the action of the plate return spring 16, is returned into its forward position, leaving the gun cocked.

The energy of the main spring 5 is released in stages by a sear box arrangement comprising two sears 30, 31 (Figures 19 and 19A), co-operating with a rack bar 32 (Figures 2, 3, 13) disposed in the stock between the main spring 5 and the sears, the forward end of the rack bar 32 being turned down to engage the rod 6 between the spring 5 and the movable abutment 10¹, so that it is movable along the inside of the stock by this abutment. The vertical edges of the serrations of the rack bar act as stops and are successively engaged by the sears which are released therefrom each time the trigger 33 is operated. In the present case the total energy of the spring, which cocked, is released in eight stages.

Figure 4:
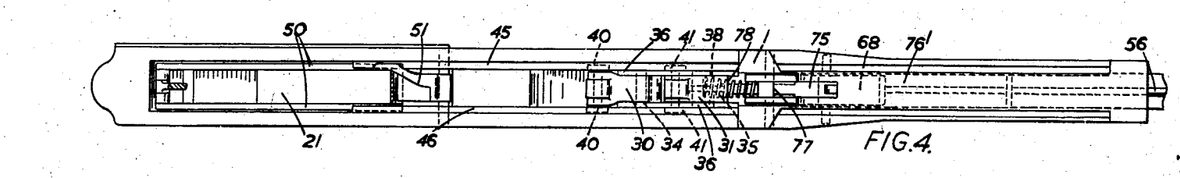
Figure 19:
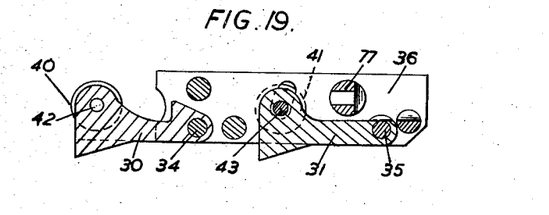
Figures 19 and 19A are, respectively, sectional elevation and plan views of the sear box.
Figure 19A:
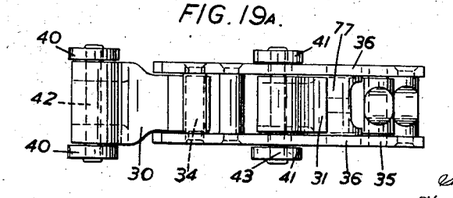

The two sears are rockably mounted one behind the other on pivot pins 34, 35, mounted in side plates 36, 36, the whole assembly forming a unit or box structure, shown separately in Figures 19 and 19A, which is resiliently mounted in position in the stock between an abutment pin 37 and a buffer spring unit 38, removably secured in the stock by a screw 38¹. The spring 38 is carried on a core 75 having a pin-like extension 75¹ adapted to be inserted into a pin bearing 77 in the sear box. Each sear has two rollers 40, 40, or 41, 41, carried respectively on opposite ends of pins 42, 43, the latter being rotatably mounted in slot bearings in the side plates 36, the rollers being loosely disposed in recesses in the stock (see Figure 4). These rollers 40, 41, cooperate with sear control bars 45, 46, (Figures 4, 13) slidingly mounted in line with the rollers in each side of the stock between recessed walls in the stock and the side plates 36 of the sear box. The upper edges of these control bars 45, 46, are formed at the ends nearer the butt as racks with eight teeth 47, and, in their central portion, they have a scolloped or wave formation having five peaks 48, the distance between each adjacent pair of peaks being equal to the distance between two serrations of the rack bar 32. The wave edges of the bars support the sear rollers. The two sear control bars are in line with the two operating lugs 20 on the movable abutment 10, and are moved by them into the cocked position shown in Figures 13 and 16. In the cocked position the two racks on the bars are engaged by the forward end of a rectangular frame 50 (Figure 13), the rear end of which is connected to the spring-pressed trigger 33, the arrangement being such that when the trigger is pulled, the frame 50 is moved forwardly, displacing the two bars 45, 46, forwardly to an extent corresponding to the distance between two rack teeth 47, this distance being equal to one-half the distance between adjacent peaks 48 on the bars and to one-third the distance between centres of the two pairs of rollers 40, 41 carried respectively on the sears.

Figures 14, 15, 16, 17, 18:
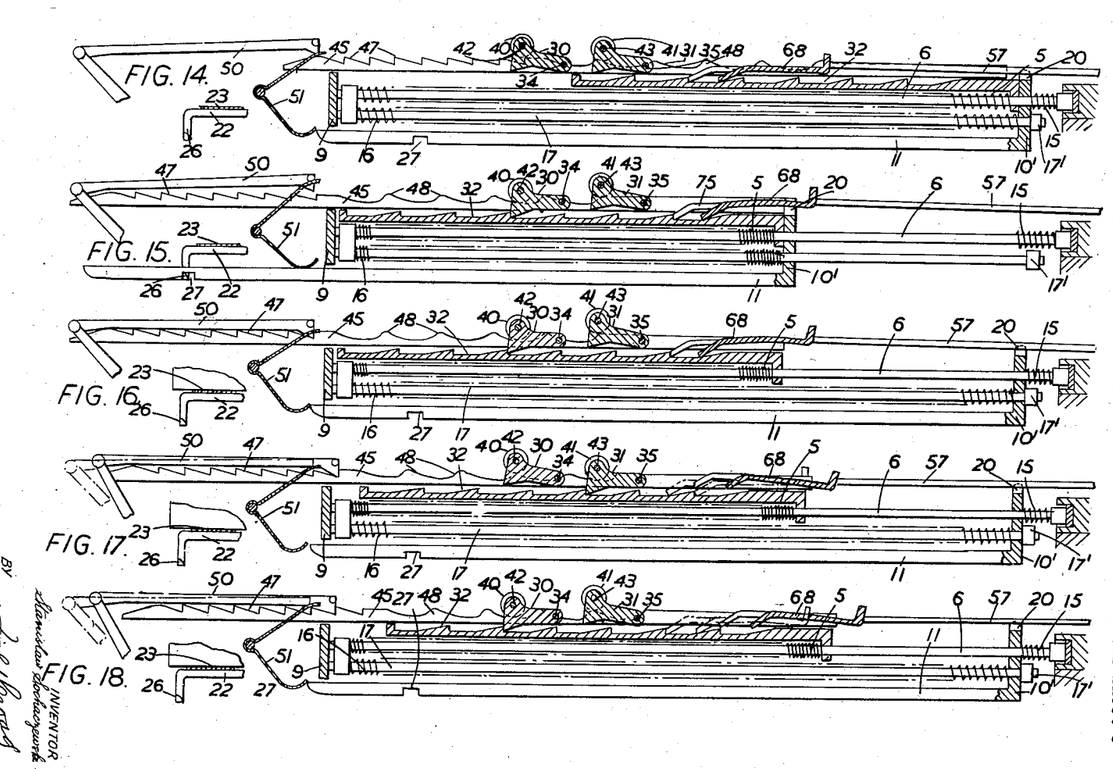
Figures 14–18 are diagrammatic views illustrating the operation of the cocking and firing mechanism, Figure 14 showing the parts in the uncocked position, Figure 15 the parts immediately after cocking, Figure 16 the parts after loading, and Figures 17 and 18 illustrating the operation of the sears.

The arrangement is such that when the gun has been cocked, and after loading, (Figure 16), the control bars 45, 46 are in such a position relatively to the two sears that peaks 48 on the two bars acting on the rollers of the front sear 31 lift the latter out of engagement with the rack bar 32, whilst the back sear 30, the rollers of which are in a depression half-way between two peaks 48 of the control bars, is lower than the front sear and engages the rack bar. When the trigger is pulled the control bars 45, 46 are displaced forwardly, with the result that peaks on the bars lift the rollers of the back sear, which is thus lifted out of engagement with the rack bar, whilst simultaneously the peaks previously supporting the rollers of the front sear are moved forwardly in order to allow the front sear to drop. The rack bar 32, released by the back sear, moves quickly forward, under the action of the main spring, for a distance equal to that between two teeth of the racks on the control bars 45, 46, i. e. equal to half the distance between the serrations of the rack bar 32, or half the distance between two peaks 48 on the control bars 45, 46, when it is stopped abruptly by the front sear, as shown in Figure 17. The momentum of the suddenly arrested rack is imparted to a target recording device in the manner hereafter described. The operation is repeated when the trigger is again pulled, the sears, after the second trigger operation, resuming the position of Figure 15, the parts being then as shown in Figure 18. The sears thus act alternately to arrest the forward movement of the rack bar until the latter reaches the end of its movement after eight operations of the trigger.

A pivoted latch 51 is actuated by the slide bar 11, when the mechanism is being cocked, to lift the frame 50 out of engagement with the racks on the control bars, to permit the latter to be moved into the cocked position, the action of the latch 51 being illustrated in Figure 15. After cocking, when the parts are in the relative positions shown in Figure 15, the dummy clip of cartridges 22 is passed through the slot 21 as above described to release the stop 26 and permit the bar to return from the position shown in Figure 15 to that shown in any one of Figures 16-18, thereby restoring the latch 51 and permitting the frame 50 to drop into driving engagement with the racks.

Figure 5:
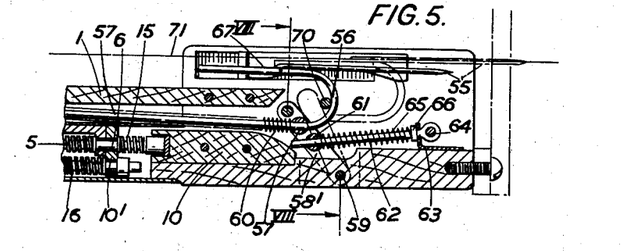
Figure 5 is a sectional elevation of the muzzle end of the rifle, illustrating the movement of the piercing end of the rod and the means for returning the rod after it has been projected from the gun.
Figure 6:
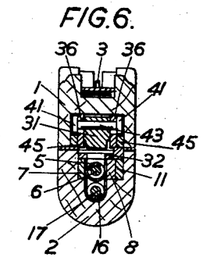
Figures 6 and 7 are cross sectional views taken on lines VI—VI and VII—VII, respectively, of Figure 2.
Figure 8:
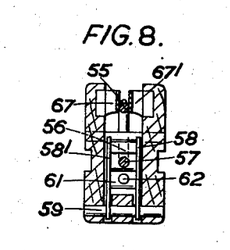
Figure 8 is a cross sectional view taken on line VIII—VIII, Figure 5, and Figure 8A as a plan view of Figure 5.
Figure 8A:
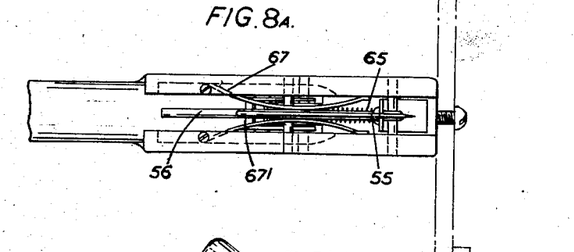

The target recording device comprises a pin-like member or dart 55 soldered or otherwise secured on top of the turned over end of a rod 56 and slidably disposed at the rear in a bearing formed in the turned down end of a plate 76 screwed on to an interior surface in the stock, and, at front, in a pin bearing 57 fixed between two side plates 58, 58¹ (Figures 2, 5 and 8), pivotally mounted on a pin 59 fixed transversely of the stock. A spring 60 mounted on the rod 56 bears at one end against the pin bearing 57 (Figure 5) and at the other end against a shoulder 57¹ (Figure 13) formed on the rod 56. A second pin bearing 61 is disposed between the plates 58, 58¹ and has slidingly mounted thereon a rod 62, one end of which passes through a bracket 63 and is secured to a pin 64. A spring 65 is mounted on the rod 62 and has one end bearing against the bearing 61 whilst the other end bears against a flange 66 on the rod 62. The pin 55 is guided between two inwardly curved leaf springs 67, 67¹, one end of each of which is secured to the stock (Figure 8A).

Figure 11:
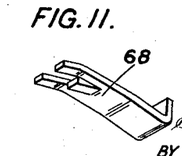
Figure 11 is a detail view of an intermediate member adapted to act directly on the target recording device.
Figure 13:
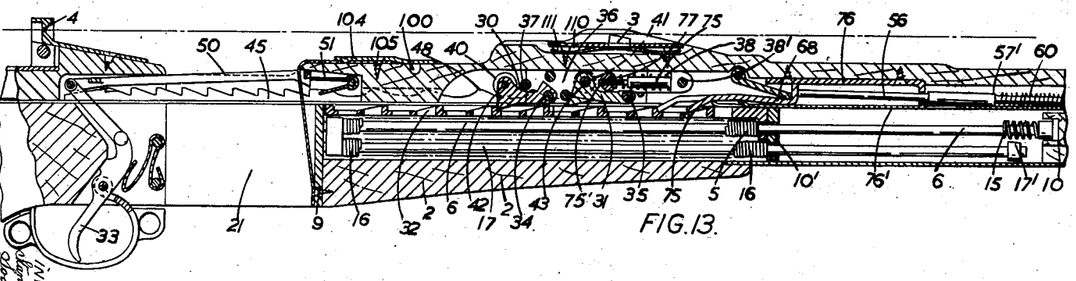
Figure 13 is a view similar to Figure 2 showing the mechanism in the cocked position.

The means for projecting the dart 55 to pierce a target comprise an intermediate member 68 (Figures 2 and 11) normally disposed and movably arranged between the plate 76 and a lower plate 76¹. As shown in Figure 11, the member 68 comprises a plate having one end turned upwards to constitute an abutment surface for the end of the rod 56, and having its other end formed with three downwardly directed tongues, viz: two outer tongues and a central tongue disposed between and shorter than the two outer tongues. As shown in Figure 13 the outer tongues and central tongue are designed respectively so as alternately to engage the teeth on the rack bar 32, as hereafter described. The rear end of the plate 76¹ is formed with a similar arrangement of tongues (Figures 2 and 13), which in this case are upwardly turned, the purpose of which will also be described later.

In the arrangement described, whenever the rack bar 32 moves forward under the action of its spring it projects the member 68, and with it the rod 56, the latter sliding easily through its bearings and compressing the spring 60 against the bearings. Under the pressure of the spring 60 the plates 58, 58¹ are moved from the position shown in full lines in Figure 5 to that shown in dot and dash lines, in which latter position they bear against a stop 70, this movement of the plates compressing the spring 65. The forward swinging movement of the plates 58, 58¹ has for effect to raise the pin 55 whilst it is being projected from the gun from the position shown in full lines (Figure 5) to the position shown in dot and dash lines, in which latter position it is in the line of sight represented by the dot and dash line 71. Immediately after projection of the pin 55 the rod 56 is returned to the initial position under the action of the compressed spring 60, the spring 65 returning the plates 58, 58¹ to the full-line position. The member 68 is also returned to the starting position shown in Figure 2 by the rod 56; during this return movement the tongues on the member 68 are raised clear of the rack by the tongues on the plate 76¹. Since the rack bar 32 is only permitted by the sear box to move forwardly at any one time a distance equal to one-half the spacing between the teeth, the distance between the ends of the outer tongues on the one hand, and the end of the central tongue on the other hand, of the member 68, corresponds to half the length of the spacing between the teeth of the rack bar, to permit these tongues alternately to engage the rack teeth.

Figures 20-25 illustrate how the gun described may be operatively associated with a target. In these figures the target is printed on a paper sheet 80 which is carried on a rectangular frame, the uprights 81 of which are extended above and below the horizontal members 82 and are slidably arranged in guides 83, 83 and 84, 84, secured to members 85 suspended from hooks 86. These hooks 86 are screwed into the top horizontal member of a frame 87, which is hingeably connected to a triangular base 88 on which it is supported by a strut 89, the upper end of which is hingeably connected to the top horizontal member of the frame 87, and the lower end of which is connected to an angle bracket which is suitably slotted to engage a screw carried in the base 88, the screw being engaged by a wing nut 90.

The target frame is held in position at the required height by turning screws 91 engaging in the guides 83, whereby the inner ends of the screws press the uprights 81 against the members 85.

Figure 20:
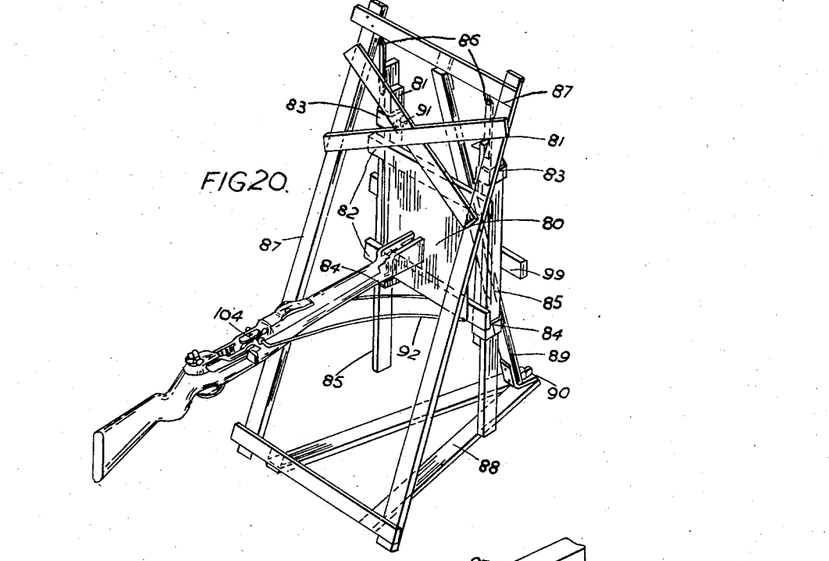
Figure 20 is a perspective view and Figure 21 a side view illustrating the gun mounted on a target carrying standard.
Figures 21, 22, 23, 26, 27:
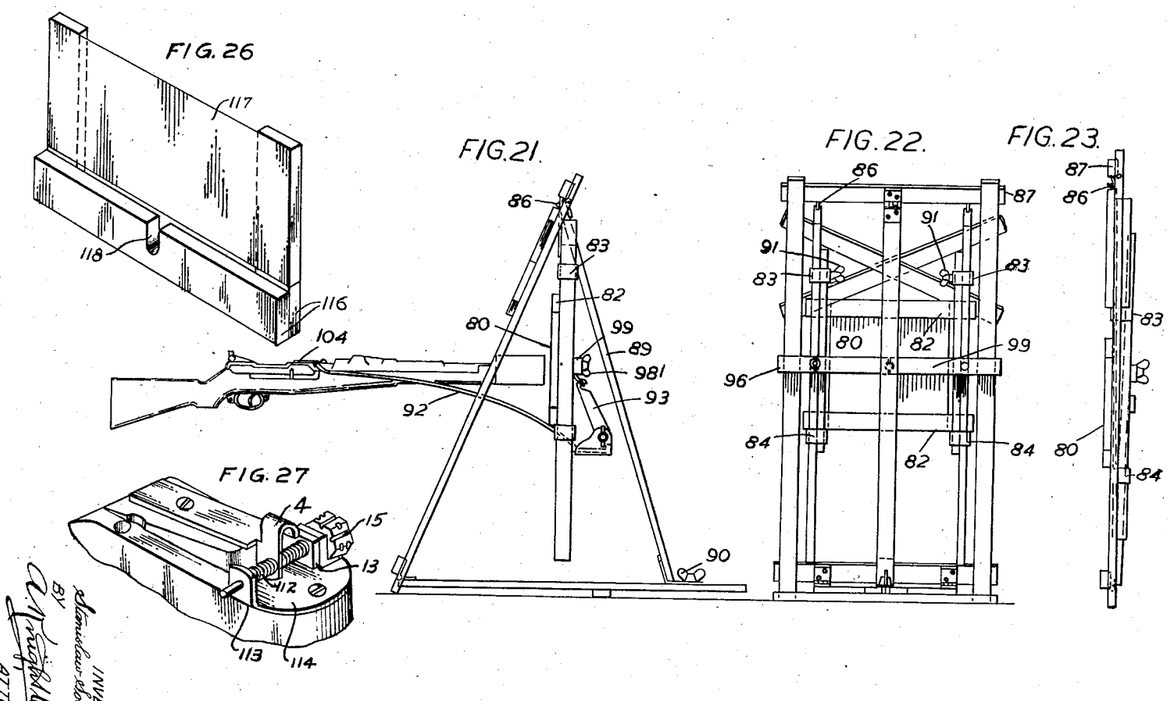

The gun is operatively associated with the target by means of a yoke comprising a rod or bar 92 bent over to form a closed link but leaving a projecting end 92¹ adapted to be engaged by the turned over end of a connecting member 93, the other end of which is formed with a hook 94 adapted to be engaged, and universally movable in, an aperture 95 formed in a bracket 96 having a recess 97 by means of which it can engage a screwed member 98 projecting from a cross bar 99 carried on the back of the suspended uprights 85. The turned over end of the member 93 is secured by a wing nut 93¹ engaging a screw on the member 93 and the bracket 96 is secured to the bar 99 by a wing nut 98¹ engaging the screw 98. Rotary movement of the member 93 on the end 92¹ of the bar 92 is prevented by means of a stop 92² projecting from the upper edge of the end 92¹. The front end of the link has two discs or flanges 93² constituting stops for the purpose hereafter described. The link is suitably curved as shown in Figures 20, 21, to permit the hand to be moved thereunder if and when the gun is resting on a support during aiming and firing. With the arrangement described it will be evident that the link and the gun carried thereon can be moved universally about the aperture 95.

Figure 1:
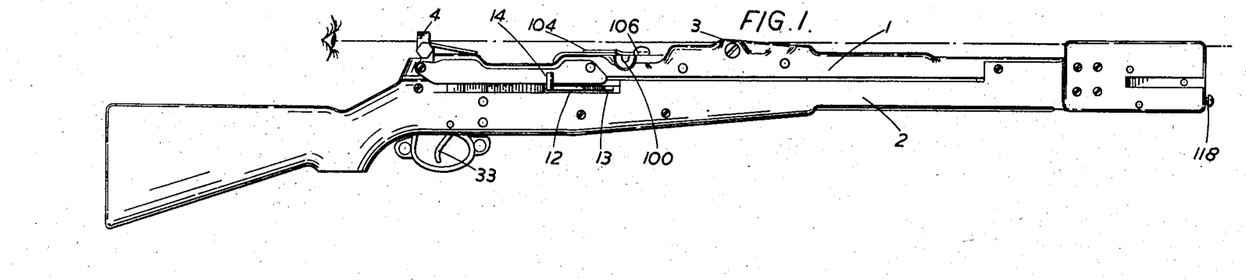
Figure 1 is an elevation of the complete practice gun.
Figures 24, 25:
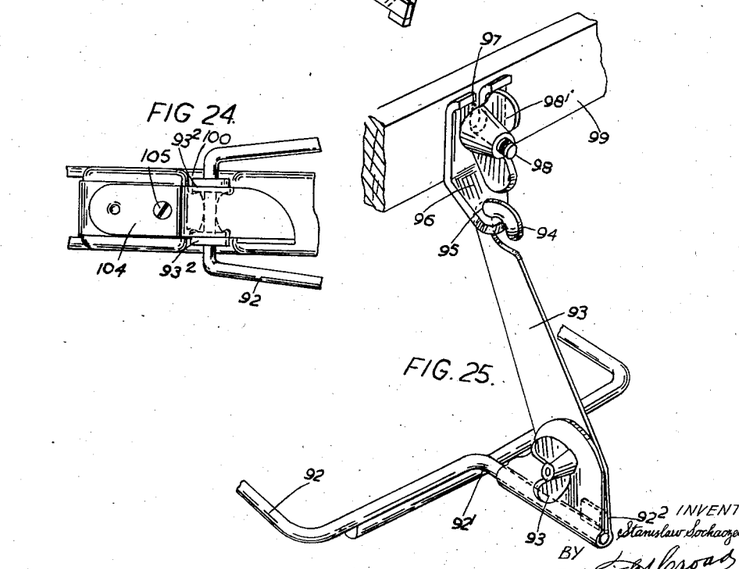
Figures 24 and 25 are detail views illustrating, respectively, how the gun is mounted on a yoke and the means for connecting the yoke to a target frame mounted on the standard.

As shown in Figures 1, 2 and 24, the gun has a vertical recess 100 in the top of the stock, the free edge of which can be closed by a catch comprising a plate 104 pivoted at 105 and having an upturned end 106 constituting a thumb piece for ready operation. In order to mount the gun in association with the target (Figure 21) the stock is passed through the closed link 92 and that part of the front end of the link between the two discs 93² is engaged in the vertical recess 100, whereupon the catch 104 is moved over to close the recess. Aiming at the target can now be effected by swinging the gun about the universal joint 94, 94¹, and, in a vertical plane about the front end of the link 93. The discs 93² prevent any sliding movement of the gun on the front cross bar of the link.

The target carrying standard can be collapsed flat for transport as shown in Figure 23 by unhooking the hook 94, loosening the wing nut 90, swinging inwards the uprights 85 and parts carried thereby and the strut 89, and folding up the base 88.

Means are provided for testing the accuracy of the path of movement of the piercing end of the rod relatively to the line of sight during projection of the rod, and for making any necessary adjustment to the line of sight to accommodate the latter to the path of the rod. These means comprise means for vertically adjusting the foresight 3 and for laterally adjusting the rear sight 4, and means for fixing a plain sheet of paper to the front end of the gun. As shown in Figures 2 and 13 the foresight 3 is carried on a plate 110 screwed against pressure from a spring 11 on to the stock. The sight can be adjusted vertically by varying the screw setting. The rear sight 4 is, as shown in detail in Figure 27, carried on a screwed rod 112 mounted in bearings 113, 113 on the base plate 114 screwed to the stock. By turning the nut 115 secured to the screw 112 the sight 4 can be moved across the stock.

Figure 26 illustrates a frame 116 to which is secured for example by pasting a blank paper sheet 117. The frame has a recess 118 adapted to engage a screw 118' projecting from the front end of the gun (see Figure 1), the frame being secured by tightening the screw. In order to test the accuracy of the path of movement of the pin 55 relatively to the line of sight the frame 116 is fixed to the gun in the manner described, and the trigger is pulled to project the pin 55 to pierce the paper sheet 117. The gun is then sighted to ascertain if the perforation is in accurate alignment with the line of sight. If not, the sights require adjustment.

What I claim is:

1. In a device for use in musketry and like training comprising a dummy gun, a trigger, a main spring operatively disposed in said dummy gun and means for cocking the gun to energise the main spring, trigger-controlled mechanism for releasing the energy of the main spring in successive stages, a target recording device housed in said gun and normally disposed below the line of sight, means for operating the target recording device with each partial release of the energy of the main spring, whereby said target recording device is projected from the gun, means operating on said target recording device during its projection to raise it into the line of sight, and means for immediately returning said target recording device into its initial position inside the gun below the line of sight.

2. In a device for use in musketry and like training comprising a dummy gun, a trigger, a main spring operatively disposed in said dummy gun and means for cocking the gun to energise the main spring, trigger-controlled mechanism for releasing the energy of the main spring in successive stages comprising a rack bar operatively associated with the main spring so as to share the movement thereof, and two sears arranged to cooperate alternately with the rack bar to limit its forward displacement each time the trigger is operated, a target recording device, housed in said gun and normally disposed below the line of sight, means for operating the target recording device with each partial release of the energy of the main spring, whereby said target recording device is projected from the gun, means operating on said target recording device during its projection to raise it into the line of sight, and means for immediately returning said target recording device into its initial position inside the gun below the line of sight.

3. In a device for use in musketry and like training comprising a dummy gun, a trigger, a main spring operatively disposed in said dummy gun and means for cocking the gun to energise the main spring, trigger-controlled mechanism for releasing the energy of the main spring in successive stages comprising a rack bar operatively associated with the main spring so as to share the movement thereof, two sears arranged to cooperate alternately with the rack bar to limit its forward displacement each time the trigger is operated, means adapted to control the operation of the sears, and means actuated by the trigger for actuating said control means, a target recording device, housed in said gun and normally disposed below the line of sight, means for operating the target recording device with each partial release of the energy of the main spring, whereby said target recording device is projected from the gun, means operating on said target recording device during its projection to raise it into the line of sight, and means for immediately returning said target recording device into its initial position inside the gun below the line of sight.

4. In a device for use in musketry and like training comprising a dummy gun, a trigger, a main spring operatively disposed in said dummy gun and means for cocking the gun to energise the main spring, trigger-controlled mechanism for releasing the energy of the main spring in successive stages comprising a rack bar operatively associated with the main spring so as to share the movement thereof, two sears arranged to cooperate alternately with the rack bar to limit its forward displacement each time the trigger is operated, bar means adapted to control the operation of the sears, each of said bar means being formed with a rack and a scolloped edge adapted to cooperate with said sears, means actuated by the trigger for engaging each of said racks to displace the bar means along the stock when the trigger is pulled, whereby the peaks and dales of each scolloped edge actuate the sears to control the movement of the rack bar, a target recording device, housed in said gun and normally disposed below the line of sight, means for operating the target recording device with each partial release of the energy of the main spring, whereby said target recording device is projected from the gun, means operating on said target recording device during its projection to raise it into the line of sight, and means for immediately returning said target recording device into its initial position inside the gun below the line of sight.

5. A device for use in musketry and like training comprising a dummy gun, a rod fixedly mounted inside the stock of the gun and extending longitudinally thereof, a fixed abutment at one end of said rod, a movable abutment at the other end of said rod, a main spring mounted on said rod between said fixed and movable abutments, means operatively connected to said movable abutment for cocking the gun to energise the main spring, a trigger, trigger-controlled mechanism for releasing the energy of the main spring in successive stages comprising a rack bar disposed in parallel relationship with said rod and slidable relatively thereto, and having one end turned down and apertured to engage said rod between the said movable abutment and the adjacent end of the main spring, and two sears arranged to cooperate alternately with the rack bar to limit its forward displacement each time the trigger is operated, a target recording device, housed in said gun and normally disposed below the line of sight, means for operating the target recording device with each partial release of the energy of the main spring, whereby said target recording device is projected from the gun, means operating on said target recording device during its projection to raise it into the line of sight, and means for immediately returning said target recording device into its initial position inside the gun below the line of sight.

6. A device according to claim 5 further comprising bar means adapted to control the operation of the sears each bar of said bar means being formed with a rack and a scolloped edge adapted to cooperate with said sears, and means actuated by the trigger for engaging each of said racks to displace the bar means along the stock when the trigger is pulled, whereby the peaks and dales of each scolloped edge actuate the sears to control the movement of the rack bar.

7. A device according to claim 5 wherein said means for cocking the gun comprise a member slidably mounted in the stock and connected to said movable abutment, and an extension to said member projecting through the stock and constituting an operating piece for cocking the mechanism.

8. A device according to claim 5 wherein said means for cocking the gun comprise a member slidably mounted in the stock and connected to said movable abutment, an extension to said member projecting through the stock and constituting an operating piece for cocking the mechanism, and further comprising bar means adapted to control the operation of the sears each bar of said bar means being formed with a rack and a scolloped edge adapted to cooperate with said sears, means actuated by the trigger for engaging each of said racks to displace the bar means along the stock when the trigger is pulled, whereby the peaks and dales of each scolloped edge actuate the sears to control the movement of the rack bar, and lugs carried on said movable abutment adapted when the latter is moved by said slidably mounted member to actuate said bar means to move them into the cocked position.

9. A device according to claim 5 wherein said means for cocking the gun comprise a member slidably mounted in the stock and connected to said movable abutment, and an extension to said member projecting through the stock and constituting an operating piece for cocking the mechanism, and further comprising means actuated by said slidably mounted member for preventing "firing" of the gun, after it has been cocked until a clip of dummy cartridges has been fed into the gun.

10. A device for use in musketry and like training comprising a dummy gun, a rod fixedly mounted inside the stock of the gun and extending longitudinally thereof, a fixed abutment at one end of said rod, a movable abutment at the other end of said rod, a main spring mounted on said rod between said fixed and movable abutments, means operatively connected to said movable abutment for cocking the gun to energize the main spring, a trigger, trigger-controlled mechanism for releasing the energy of the main spring in successive stages comprising a rack bar disposed in parallel relationship with said rod and slidable relatively thereto, and having one end turned down and apertured to engage said rod between the said movable abutment and the adjacent end of the main spring, and two sears arranged to cooperate alternately with the rack bar to limit its forward displacement each time the trigger is operated, a target recording device operating in the line of sight, means for operating the target recording device with each partial release of the energy of the main spring, said means for cocking the gun comprising a member slidably mounted in the stock and connected to said movable abutment and means for moving said slidably mounted member backwards and forwards along the stock, and further comprising bar means adapted to control the operation of the sears, each bar of said bar means being formed with a rack and a scolloped edge adapted to cooperate with said sears, a member actuated by the trigger for engaging each of said racks to displace the bar means along the stock when the trigger is pulled, whereby the peaks and dales of each scolloped edge actuate the sears to control the movement of the rack bar, means actuated by said slidably mounted member for preventing "firing" of the gun, after it has been cocked, until a clip of dummy cartridges has been fed into the gun, said means comprising a latch operated by the slidably mounted member to hold said trigger actuated member out of engagement with said racks and restoring means actuated by the insertion of a dummy clip of cartridges to restore the slidably mounted member and the latch, thereby permitting the trigger actuated member to engage said racks.

11. A device for use in musketry and like training comprising a dummy gun, a rod fixedly mounted inside the stock of the gun and extending longitudinally thereof, a fixed abutment at one end of said rod, a movable abutment at the other end of said rod, a main spring mounted on said rod between said fixed and movable abutments, means operatively connected to said movable abutment for cocking the gun to energize the main spring, a trigger, trigger-controlled mechanism for releasing the energy of the main spring in successive stages comprising a rack bar disposed in parallel relationship with said rod and slidable relatively thereto, and having one end turned down and apertured to engage said rod between the said movable abutment and the adjacent end of the main spring, and two sears arranged to cooperate alternately with the rack bar to limit its forward displacement each time the trigger is operated, a target recording device operating in the line of sight, means for operating the target recording device with each partial release of the energy of the main spring, said means for cocking the gun comprising a member slidably mounted in the stock and connected to said movable abutment and means for moving said slidably mounted member backwards and forwards along the stock, and further comprising bar means adapted to control the operation of the sears, each bar of said bar means being formed with a rack and a scolloped edge adapted to cooperate with said sears, a member actuated by the trigger for engaging each of said racks to displace the bar means along the stock when the trigger is pulled, whereby the peaks and dales of each scolloped edge actuate the sears to control the movement of the rack bar, means actuated by said slidably mounted member for preventing "firing" of the gun, after it has been cocked, until a clip of dummy cartridges has been fed into the gun, said means comprising a latch operated by the slidably mounted member to hold said trigger actuated member out of engagement with said racks, restoring means actuated by the insertion of a dummy clip of cartridges to restore the slidably mounted member and the latch, said restoring means comprising a spring adapted to be energised when the slidably mounted member is moved into the cocked position and a spring catch adapted to engage and hold the slidably mounted member in the cocked position, said spring catch being operable by the insertion of the clip of dummy cartridges to release the said member whereupon it is returned by the action of the energised spring to the initial position, said latch then permitting the trigger actuated member to engage said racks.

12. In a device for use in musketry and like training comprising a dummy gun, a trigger, a main spring operatively disposed in said dummy gun and means for cocking the gun to energise the main spring, trigger-controlled mechanism for releasing the energy of the main spring in successive stages comprising a rack bar operatively associated with the main spring so as to share the movement thereof and two sears arranged to cooperate alternately with the rack bar to limit its forward displacement each time the trigger is operated, a target recording device comprising a rod having means for piercing a target adapted to be projected from the gun with each partial release of the energy of the main spring, and restoring means operatively associated with said rod and adapted to be energised each time the rod is actuated by the main spring.

13. In a device for use in musketry and like training comprising a dummy gun, a trigger, a main spring operatively disposed in said dummy gun and means for cocking the gun to energise the main spring, trigger-controlled mechanism for releasing the energy of the main spring in successive stages comprising a rack bar operatively associated with the main spring so as to share the movement thereof, and two sears arranged to cooperate alternately with the rack bar to limit its forward displacement each time the trigger is operated, a target recording device comprising a rod having means for piercing a target, a member slidably arranged in the stock of the gun in butting contact with the rear end of said rod and adapted to engage the teeth on the rack bar, said member serving to transmit energy pulses from said rack bar to said rod to project the piercing end thereof, and restoring means operatively associated with said rod and adapted to be energised each time the rod is actuated by said energy impulses.

14. A device for use in musketry and like training comprising a dummy gun having a closable slot by means of which it can readily be operatively yoked to a target carrying stand, a main spring operatively disposed in said dummy gun, means for cocking the gun to energise the main spring, a trigger, trigger-controlled mechanism for releasing the energy of the main spring in successive stages, a target recording device, and means for operating the target recording device with each partial release of the energy of the main spring.

15. A device for use in musketry and like training comprising a standard, a target carrying frame, means for freely suspending the target carrying frame on said standard, a dummy gun adapted to be operatively yoked to said target carrying frame, a main spring operatively disposed in said dummy gun and means for cocking the gun to energise the main spring, a trigger, trigger-controlled mechanism for releasing the energy of the main spring in successive stages, a target recording device, and means for operating the target recording device with each partial release of the energy of the main spring.

16. A device for use in musketry and like training comprising a standard, a target carrying frame, means for freely suspending the target carrying frame on said standard, a dummy gun, a yoke connected for universal movement to said target carrying frame, means for detachably connecting the dummy gun to said yoke, said means permitting the gun to be rockable in a vertical plane on said yoke, a main spring operatively disposed in said dummy gun and means for cocking the gun to energise the main spring, a trigger, trigger-controlled mechanism for releasing the energy of the main spring in successive stages, a target recording device, and means for operating the target recording device with each partial release of the energy of the main spring.

17. A device for use in musketry and like training comprising a standard comprising members hingeably connected together, permitting the standard to be folded flat for transport, a target carrying frame, means for freely suspending the target carrying frame on said standard, a dummy gun, a yoke detachably connected for universal movement to said target carrying frame, means for detachably connecting the dummy gun to said yoke, said means permitting the gun to be rockable in a vertical plane on said yoke, a main spring operatively disposed in said dummy gun and means for cocking the gun to energise the main spring, a trigger, trigger-controlled mechanism for releasing the energy of the main spring in successive stages, a target recording device, and means for operating the target recording device with each partial release of the energy of the main spring.

STANISLAW SOCHACZEWSKI.